Feb. 14, 1961  R. M. DILWORTH ET AL  2,971,478
RAILWAY VEHICLE
Filed Aug. 26, 1953  4 Sheets-Sheet 1
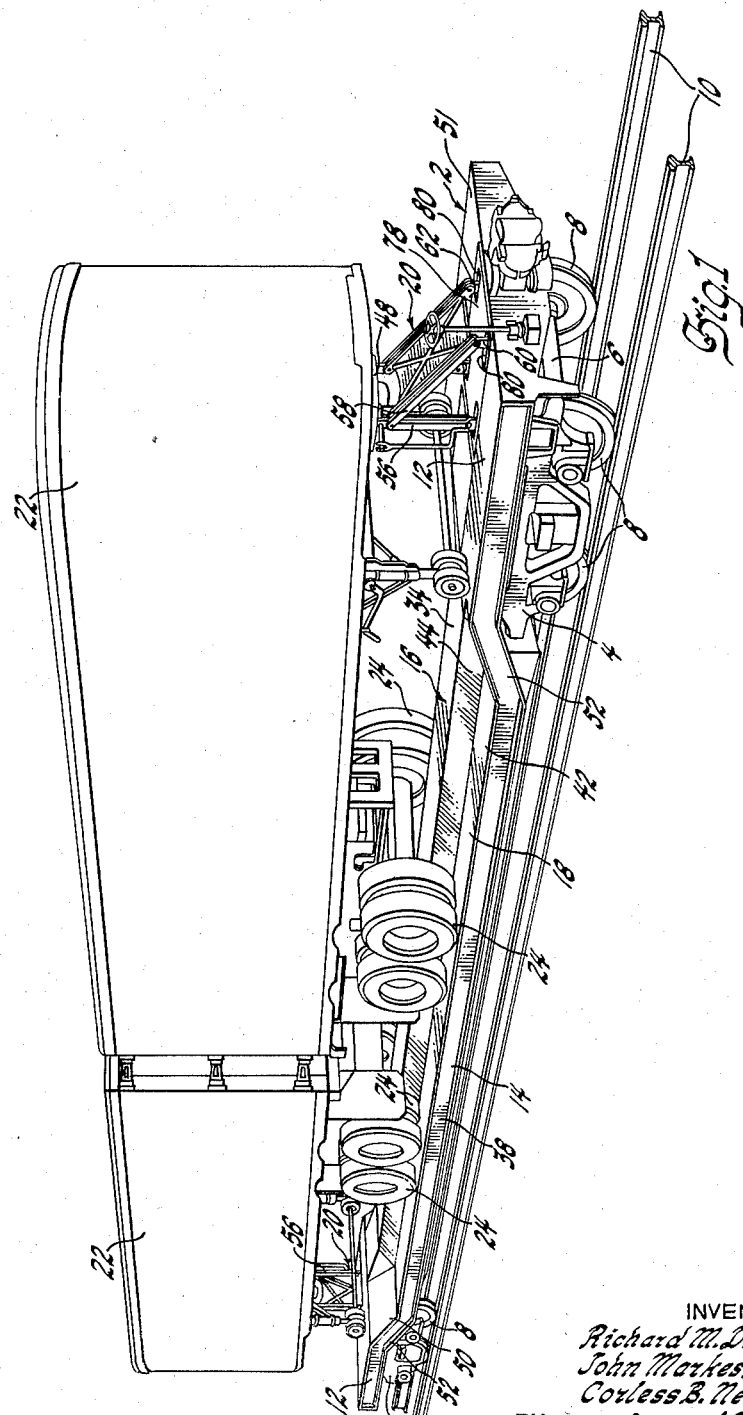
INVENTORS
Richard M. Dilworth,
John Markestein, &
Corless B. Nelson
BY S. C. Thorpe
ATTORNEY Feb. 14, 1961
R. M. DILWORTH ET AL
2,971,478
Filed Aug. 26, 1953
4 Sheets-Sheet 2
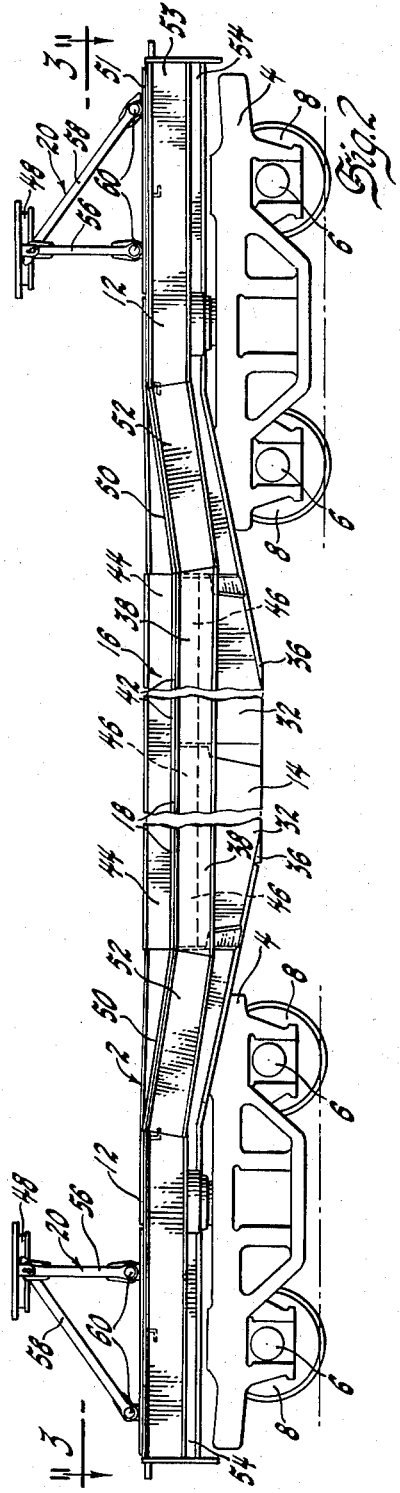
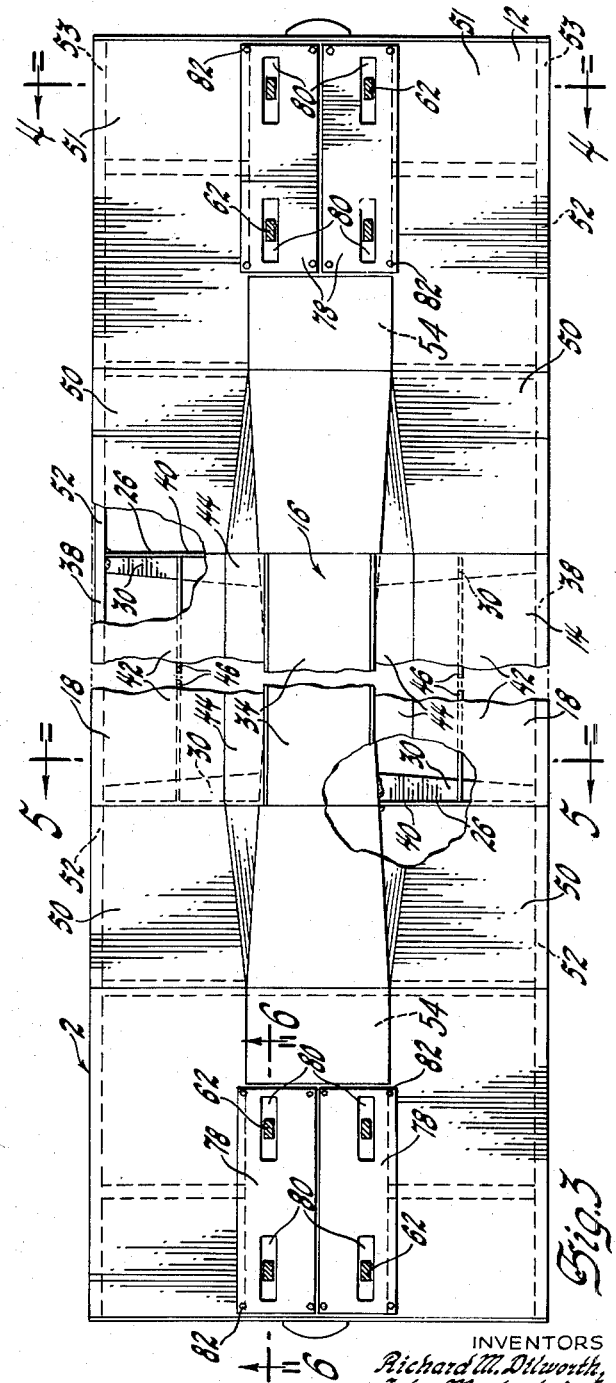
INVENTORS
Richard M. Dilworth,
John Markestein, &
Corless B. Nelson
BY
J. C. Thorpe
ATTORNEY Feb. 14, 1961    R. M. DILWORTH ET AL    2,971,478
RAILWAY VEHICLE
Filed Aug. 26, 1953    4 Sheets-Sheet 3
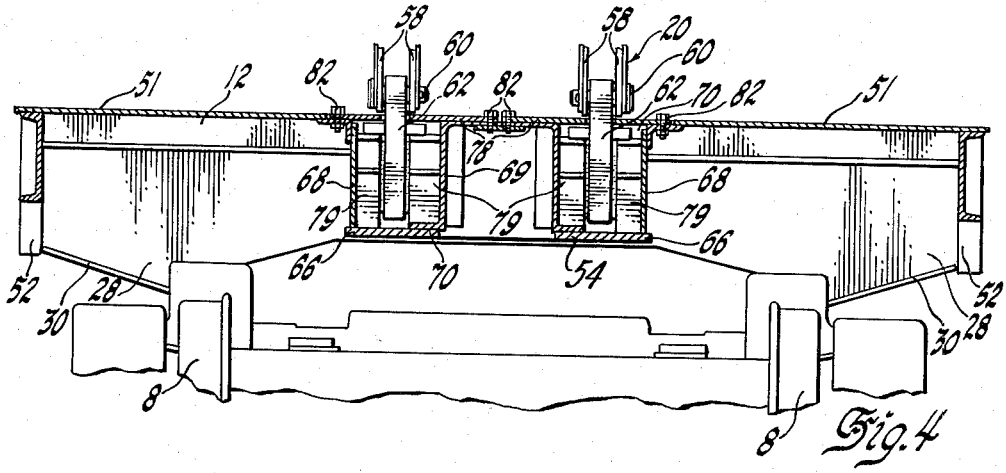
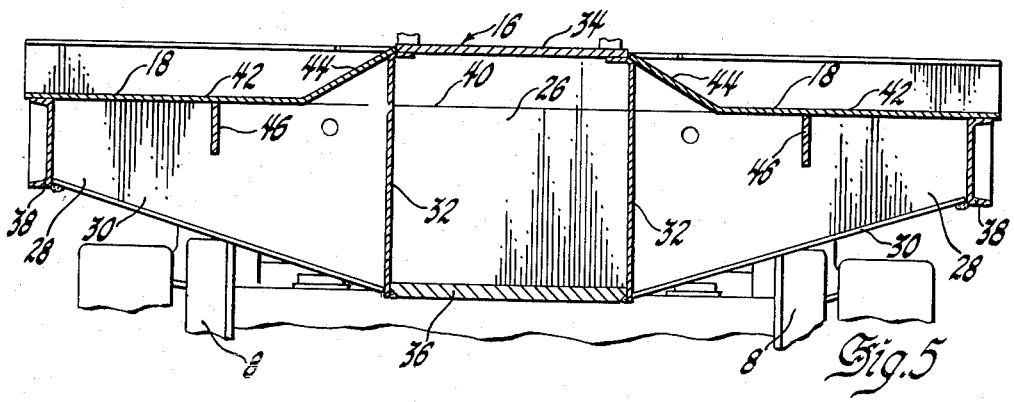
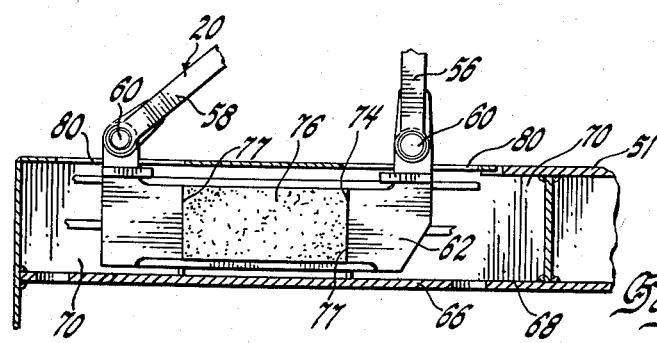
INVENTORS
Richard M. Dilworth
John Markestein, &
Corless B. Nelson
BY
J. C. Thorpe
ATTORNEY

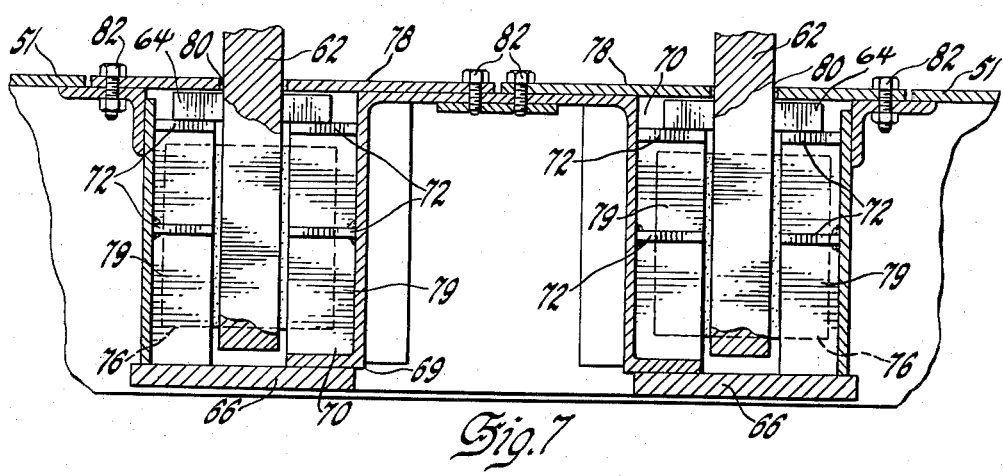
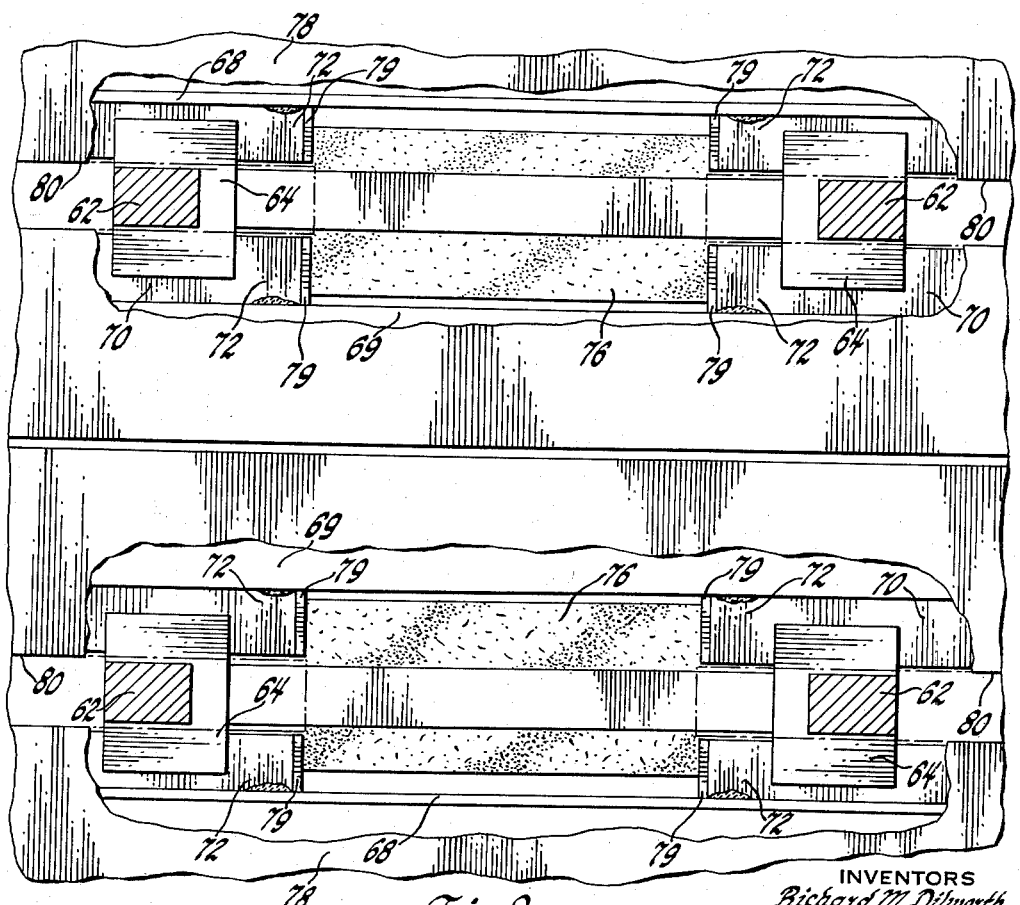

United States Patent Office 2,971,478
Patented Feb. 14, 1961

2,971,478
RAILWAY VEHICLE

Richard M. Dilworth, Hinsdale, John Markestein, Westchester, and Corless B. Nelson, Chicago, Ill., assignors to General Motors Corporation, Detroit, Mich., a corporation of Delaware Filed Aug. 26, 1953, Ser. No. 376,601

4 Claims. (Cl. 105—368)

This invention relates generally to railway vehicles and more specifically to freight cars which may be used for the transporting of highway motor vehicles, special emphasis being placed upon railway cars particularly adapted to carry large motor truck semi-trailers.

The general congestion and rapid deterioration of the highways in the United States, at least in part, may be attributed to the ever-increasing numbers of large motor trucks and semi-trailers using these highways, not only for short hauls but relatively long ones as well. An attempt is being made to at least partially relieve this situation by encouraging the trucking industry to use the railroads to transport these trucks and semi-trailers between points which normally constitute the longer hauls. It has been determined, however, that if the trucking industry isto be encouraged to use the railroads' facilities means must be provided which will enable these trucks and semi-trailers to be very quickly loaded and unloaded before and after being transported. The most practical means which has so far been suggested for accomplishing this results is to load and unload these freight cars from the sides thereof. It has also been determined that the railroads must normally be able to carry more than one motor truck semi-trailer per freight car in order to establish economical freight rates which will induce the trucker to use the railroad facilities.

The construction of a freight car which will safely carry at least two motor truck semi-trailers and which can be easily and quickly loaded and unloaded from the sides thereof, however, presents many problems which heretofore have not been satisfactorily solved. One of the most difficult of these problems is to provide a freight car whose weight is not materially greater than other railway cars but whose strength is great enough to safely carry at least two semi-trailers. Related to this problem is the difficulty of how to fabricate such a car with the extremely long span necessary to accommodate two semi-trailers. The fact that the usual semi-trailer when carried on a conventional freight car will not clear many of the tunnels and other obstructions normally encountered on most of the railroads further complicates the situation, because it means that to be satisfactory the construction of the proposed vehicle must enable the vehicle to carry the semi-trailer low enough to clear all overhead obstructions. In other words, the proposed freight car must be capable of being quickly loaded and unloaded from the sides thereof and capable of carrying the semi-trailers substantially closer to the rails than the conventional freight car in addition to having a greater span and greater strength for approximately the same weight.

It is, therefore, broadly an object of this invention to provide a railway vehicle of extremely long span whose unique fabrication provides a maximum of strength with a minimum of weight.

It is a further and narrower object of this invention to provide a railway vehicle whose unique construction is particularly adapted to the safe carriage of a plurality of motor truck semi-trailers.

It is still another object of this invention to provide a railway vehicle whose construction includes a depressed center section which will transport motor truck semi-trailers at a height to clear the overhead obstructions encountered on the various railroads.

It is a further object of this invention to provide a railway vehicle having a depressed center section with a raised or projecting beam intermediat the sides of the depressed center section, the beam acting as the main supporting member of the railway vehicle.

It is a further object of this invention to provide a railway vehicle for the transporting of motor truck semi-trailers, the vehicle having a depressed center section with a raised beam intermediate the sides of the depressed center section defining a pair of ways for the reception of the semi-trailer wheels, the beam acting to restrain the semi-trailer wheels against lateral movement during transporting of the semi-trailers.

It is an even further object of this invention to provide a railway vehicle whose unusual construction allows motor truck semi-trailers to be quickly loaded and unloaded from the sides thereof, the railway vehicle being provided with shock resisting means for quickly securing semi-trailers thereon in a manner which will safely transport the semi-trailers with a minimum of shock.

Other objects of this invention will become apparent by referring to the accompanying description and drawings, in which:

Fig. 1 is a perspective view of the new railway vehicle showing a pair of motor truck semi-carriers supported thereon and illustrates how the wheels and axles of the semi-trailers straddle the main supporting member of the freight car and are thereby restrained against lateral movement during movement of the vehicle.

Fig. 2 is a side view in elevation of the vehicle and shows how the center section is depressed as well as means at either end of the car for receiving and anchoring the semi-trailer king pins.

Fig. 3 is a view taken along the line 3—3 of Fig. 2 and shows the car in plan with parts broken away to emphasize some of the unique construction details which give the car great strength with a minimum of weight.

Fig. 4 is an end view of the freight car taken on the line 4—4 of Fig. 3 and shows the general details of construction of resilient shock resisting means acting between the freight car frame and the means for supporting the semi-trailer king pins.

Fig. 5 is a view on line 5—5 of Fig. 3 taken approximately at the center looking toward one end of the freight car and shows the unique details of construction of the depressed center section of the freight car which allow it to be conveniently assembled and which give the unusual strength characteristics needed without any substantial increase in weight.

Fig. 6 is a sectional view taken on line 6—6 of Fig. 3 through one side of the resilient shock absorbing means for supporting the trailer king pin.

Fig. 7 is an enlarged view of a portion of Fig. 4 to more clearly illustrate the details of construction of the resilient shock resisting means.

Fig. 8 is a view in plan of one end of the freight car with portions of the upper plating broken away to further illustrate the location and details of the unique shock resisting means.

Referring now to Fig. 1, the new freight car, indicated generally by the numeral 2, is supported at the ends thereof by means of trucks assemblies 4 including axles 6 and wheels 8 adapted to roll on the rails 10. The freight car 2 includes end portions or sections 12 under which the truck assemblies 4 are disposed. Intermediate the end sections 12 is a depressed center section 14. Extending along the center of the depressed section 14 intermediate the sides thereof is a beam 16 which defines a pair of tracks or ways 18 on opposite sides thereof. At each end of the freight car and resiliently secured thereto is a semi-trailer king pin supporting means indicated generally by the numeral 20.

To illustrate the function of the freight car 2 a pair of semi-trailers 22 are shown in position thereon with their wheels 24 resting on the ways or tracks 18 and straddling the beam 16. The king pins of the trailers 22 are received by the supporting means 20. It will be noted that by providing the freight car 2 with the depressed center section 14 the entire semi-trailers 22 may be substantially lowered to provide the clearance which is necessary to haul these semi-trailers through any tunnels or below other overhead obstructions which may be encountered, a result which simply cannot be achieved with the conventional railway car. The beam 16 (to be later described in detail) in addition to acting as the main strength member of the novel freight car serves as a detent to restrain the semi-trailer wheels 24 against lateral movement which otherwise might cause the semi-trailers 22 to fall off of the freight car 2.

Referring now to Figures 2 through 5 the unique construction of this freight car will be described in detail. As has already been stated the freight car comprises a pair of end sections 12 and a depressed center section 14. The depressed center section includes a plurality of longitudinally spaced ribs 26 having end portions 28 extending transversely with respect to the longitudinal center line of the car. The portions 28 are provided with stiffening flanges 30 along the lower edges thereof. Longitudinally extending between adjacent ribs 26 and welded or otherwise suitably secured therebetween are vertical angle stiffening plates 32. The angle stiffening plates 32 form the vertical sides of the fabricated beam 16 which when fully constructed extends for the length of the depressed center section 14 and is secured to and supported by the fabricated end sections 12. The upper side of the beam 16 comprises a plurality of coextensive top plates 34 welded or otherwise suitably secured end to end each of which may extend longitudinally between or over any desired number of ribs 26. In other words, the plates 34 may be made or cut to any desired length so long as their combined length is that of the beam 16. The under side of the fabricated beam 16 similarly comprises a plurality of coextensive longitudinally extending bottom plates 36 welded or otherwise suitably secured end to end. Any of these bottom plates 36, as in the case of the top plates 34, may extend between or under any number of the ribs 26 as long as their combined length is that of the beam 16. The plates 34 and 36 are welded or otherwise suitably secured to the lateral and vertical angle stiffening plates 32. The lateral edges of the end portions 28 of the ribs 26 are secured together by means of longitudinally extending channels 38 welded or otherwise suitably secured thereto. The channels 38 although not relied on to increase the rigidity of the depressed center section and its resistance to bending, actually do provide a considerable amount of stiffness and their combined lengths should preferably be the same as that of the beam 16. Supported by and secured to the upper edges 40 of the ribs 26 are a plurality of longitudinally extending floor plates 42 which also may be welded or secured together in convenient lengths. Inner portions 44 of the floor plates 42 are bent to incline upwardly toward the center of the vehicle so that the inner edges of the plates 42 may be welded or otherwise secured to the top center plates 34 and the heels of the angle stiffening plates 32. In order to insure adequate support for the floor plates 42 vertical stiffeners 46 are secured to the undersides thereof and extend between and are also secured to the end portions 28 of adjacent ribs 26.

The unusual construction features of the depressed center section of this new type of railway vehicle may now be fully appreciated. It will be observed that the unique construction provides a single fabricated beam of essentially box section which extends the length of the depressed center section. Because of its extremely large box section this beam has the unusual stiffness and resistance to bending over a long span necessary to support two motor truck semi-trailers without materially increasing the weight of the freight car. By making the ribs integral so that they extend uninterruptedly to the sides of the freight car and by having the stiffening plates 32 extending for only short lengths between the longitudinally spaced ribs of the depressed center section the freight car may be partially fabricated in convenient lengths to be later assembled into the entire freight car. Although any number of lengths can be fabricated before finally assembling the freight car, the method preferred is to first assemble the car body into essentially three lengths, two of the lengths including an end section 12 and an end portion of the depressed center section. The third length would include the remaining portion of the depressed center section.

As stated, the end sections 12 are welded or otherwise suitably secured to and support the ends of the fabricated beam 16. The end sections 12 are completely fabricated and have small beams 54 at their centers which are secured to and are generally similar to the beam 16. Plating 50 and channels 52 are provided to join the floor plates 42 and the channels 38 of the depressed center section with the floor plates 51 and channels 53 of the end sections 12 to maintain a pleasing continuity to the freight car which gradually reduces the depth of the depressed center section.

One of the features of this freight car which deserves special emphasis at this point is the unique way in which advantage is taken of the clearance between the undersides of the semi-trailer axles and the freight car floor plating 42. This clearance is utilized to make the cross-section of the fabricated beam 16 large enough to obtain the necessary strength and stiffness without having to increase the sizes of the plates 32, 34 and 36 or make the center section of the freight car so low that it would interfere with the car's movement along the rails. It will also be observed that the portion of the fabricated beam 16 extending above the floor plates 42 forms a natural detent to restrain the semi-trailer wheels 24 against lateral movement when the semi-trailers are being transported.

In order to take full advantage of this natural detent and to be able to quickly load and unload the semi-trailers from the sides of the freight cars the inclined portions 44 have been provided. This manner of loading and unloading may be accomplished by providing a platform (not shown) on either side of the freight car which is at the same level as the floor plating 42. The semi-trailers may then be maneuvered from these platforms located along the sides of the freight car so that one set of wheels will roll up the inclined portions 44 on one side of the beam 16, across the top center plates 34, and down the opposite inclined portions 44 to the other side of the beam 16. This can be easily done when the semi-trailers 22 are maneuvered onto the freight car at an angle therewith. Once the semi-trailers are turned or pivoted into position on the freight car, however, with the wheels 24 resting on either side of beam 16 on floor plates 42 and with the trailer king pin anchored to the supporting means 20, it should be readily appreciated that a considerable amount of resistance will be offered to any lateral movement of the wheels 24 with respect to the freight car 2. Removal of the semi-trailer 22 from the freight car may be quickly and easily accomplished by pulling the forward end of the semi-trailers at an angle so that one set of semi-trailer wheels will roll along a substantially horizontal curve whose center of curvature is located approximately at the place where the other set of semi-trailer wheels reside on the freight car.

In order to anchor the semi-trailer king pins so that the semi-trailers will not move longitudinally and so that their forward portions will not move laterally with respect to the freight car, an anchoring means 48 similar to the "fifth wheel" of a motor truck tractor is provided to receive and anchor the usual king pin of the semi-trailers. Suitable means may be provided in this anchoring means 48 which will lock the semi-trailer king pin against vertical and horizontal movement with respect thereto.

A shock absorbing means 20 has been procided to retain the semi-trailers 22 on the freight car so that they will not be subjected to too much shock which might otherwise injure the goods carried thereon. This shock absorbing means is best illustrated in Figures 2, 3, 4 and 6 and comprises two sets of vertically extending struts 56 and angularly extending struts 58 having semi-trailer king pin anchoring means 48 pivotally secured thereto. The lower ends of each set of struts 56, 58 are pivotally secured by means of pins 60 to sliding block assemblies 62. Suitably secured to the upper plating 51 of the end sections 12 and the plating 66 are vertical plates 68 and an inverted U-shaped plate 69 which form rectangularly shaped wells 70 for the reception of the sliding block assemblies 62. Fixed within each well 70 are longitudinally spaced apart abutments in the form of transversely extending plates 79 welded at their lower ends to the bottom surfaces of the wells and braced intermediate their ends and at their upper ends by upper and lower gusset plates 72. Each of the sliding block assemblies 62 includes a top base plate 64 slidable along the upper gusset plates 72. Secured in a rectangular opening 74 in each of the sliding block assemblies 62 is a large block 76 formed of suitable resilient material which is engaged on opposite sides thereof by the longitudinally facing surfaces 77 defining the ends of the opening 74 in the sliding block assembly 62 and by the longitudinally facing surfaces of the abutment plates 79 (see Fig. 7). Cover plates 78 with elongated slots 80 are secured to the floor plating 51 of end sections 12 by bolt and nut assemblies 82 to cover the wells 70, the slots 80 being provided to allow limited longitudinally movement of the sliding block assemblies 62 relative to the car.

The operation of this resilient supporting means is as follows: If the freight car with the semi-trailers supported thereon should be subjected to sudden movements which tend to cause relative longitudinal movement between the semi-trailers and the freight car the shock of this longitudinal movement would be absorbed by compressing the resilient block 76 between a longitudinal end facing surface 77 on the sliding block assembly 62 and the oppositely facing abutment plates 79. This resilient supporting means, although of relatively simple construction, will effectively absorb any longitudinal shocks to which the freight car might be subjected tending to injure the goods carried.

It may now be appreciated that a novel railway vehicle has been proposed which provides the following: its unusual fabrication gives it great strength for extremely long spans with a minimum of weight, its depressed center section makes it particularly adaptable for the carriage of motor truck semi-trailers at heights which will clear the overhead obstructions on any standard gauge railroad, it can be pre-assembled in convenient lengths, it provides a natural detent for restraining semi-trailers carried thereon against lateral movement, it can be easily and quickly loaded and unloaded from the sides thereof, and it absorbs shock for the protection of the goods in semi-trailers carried thereon. It should be further emphasized that this railway vehicle fills a basic need and is offered as a partial solution to the extremely serious problem of what can be done to improve the conditions of highways generally and particularly those of the United States.

We claim:

1. A railway vehicle for the transporting of wheeled vehicles comprising a pair of end sections having supporting wheels and axles disposed thereunder, a depressed center section intermediate said end sections, a raised beam extending along the middle of said depressed center section intermediate the sides thereof, said raised beam defining a pair of ways along the sides of said depressed center section for the reception of the wheels of said wheeled vehicles, and inclined surfaces extending between said ways and the upper surface of said beam forming ramps for guiding the wheels of said wheeled vehicles over said center section.

2. A railway vehicle for the transporting of motor truck semi-trailers comprising a pair of end sections having supporting wheels and axles disposed thereunder, a depressed center section intermediate said end sections, a raised beam extending along the middle of said depressed center section intermediate the sides thereof, said raised beam defining a pair of ways along the sides of said depressed center section for the reception of the wheels of said semi-trailers, and inclined surfaces extending between said ways and the upper surface of said beam forming ramps for guiding said semi-trailer wheels over said center section, said inclined surfaces and said raised beam acting as detent means for said semi-trailer wheels when said semi-trailers are in position for being transported on said railway vehicle.

3. A railway vehicle for the transporting of wheeled vehicles comprising a pair of end sections having supporting wheels and axles disposed thereunder, a depressed center section intermediate said end sections, said center section including a plurality of longitudinally spaced ribs having transversely extending end portions, a plurality of members extending between said ribs and secured thereto intermediate the end portions thereof, said members combining with said ribs to form a supporting beam having a raised portion extending the length of said section intermediate the sides thereof, longitudinally extending plates on either side of said supporting beam below the raised portion thereof for the reception of the wheels of said wheeled vehicles, and inclined surfaces extending between said plates and the upper surface portions of said beam forming ramps for guiding the wheels of said wheeled vehicles over said beam.

4. A railway vehicle for the transporting of wheeled vehicles comprising a pair of end sections having supporting wheels and axles disposed thereunder, a depressed center section intermediate said end sections, a raised beam extending along the middle of said depressed center section intermediate the sides thereof, said beam defining a pair of ways along the sides of said depressed center section for the reception of the wheels of said wheeled vehicles, and inclined surfaces extending between said ways and the upper surface of said beam forming ramps for guiding the wheels of said wheeled vehicles to said center section.

References Cited in the file of this patent

UNITED STATES PATENTS

| | | |
|---|---|---|
| 1,810,874 | Werst et al. | June 16, 1931 |
| 1,812,807 | Snyder | June 30, 1931 |
| 1,816,897 | Fedderman et al. | Aug. 4, 1931 |
| 1,968,705 | Regan | July 31, 1934 |
| 2,001,935 | Otis | May 21, 1935 |
| 2,036,344 | Menhall | Apr. 7, 1936 |
| 2,099,288 | Allen | Nov. 16, 1937 |
| 2,121,181 | Bayerl | June 21, 1938 |
| 2,183,054 | Tesseyman et al. | Dec. 12, 1939 |
| 2,561,653 | Eksergian | July 24, 1951 |
| 2,659,318 | Steins et al. | Nov. 17, 1953 |

UNITED STATES PATENT OFFICE

CERTIFICATION OF CORRECTION

Patent No. 2,971,478            February 14, 1961

Richard M. Dilworth et al.

It is hereby certified that error appears in the above numbered patent requiring correction and that the said Letters Patent should read as corrected below.

Column 1, line 30, for "isto" read -- is to --; line 35, for "results" read -- result --; column 2, line 10, for "intermediat" read -- intermediate --; line 69, for "trucks" read -- truck --; column 5, line 13, for "procided" read -- provided --; line 45, for "longitudinally" read -- longitudinal --; column 6, line 45, strike out "surface"; same column 6, list of references cited, add the following reference:

2,880,681    Markestein et al. ---- Apr. 7, 1959

Signed and sealed this 1st day of August 1961.

(SEAL)
Attest:

ERNEST W. SWIDER
Attesting Officer

DAVID L. LADD
Commissioner of Patents